United States Patent
Ebenhoch et al.

(10) Patent No.: US 6,936,685 B2
(45) Date of Patent: Aug. 30, 2005

(54) METHOD FOR ISOLATING POLYORGANOSILOXANES

(75) Inventors: Jochen Ebenhoch, Burghausen (DE); Thomas Köhler, Kastl (DE); Hans Wintrich, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/332,172

(22) PCT Filed: Mar. 29, 2001

(86) PCT No.: PCT/EP01/03597

§ 371 (c)(1),
(2), (4) Date: Jun. 9, 2003

(87) PCT Pub. No.: WO02/02672

PCT Pub. Date: Jan. 10, 2002

(65) Prior Publication Data

US 2004/0026316 A1 Feb. 12, 2004

(51) Int. Cl.$^7$ .................................................. C08J 3/00
(52) U.S. Cl. ....................... 528/491; 528/487; 528/489; 528/493; 528/495; 528/497; 528/499; 528/501; 528/502 E
(58) Field of Search ................. 528/487, 489, 528/491, 493, 495, 497, 499, 501, 502 E

(56) References Cited

U.S. PATENT DOCUMENTS 5,049,636 A    9/1991  Wolfgruber et al.
5,110,865 A *  5/1992  Ona et al. .................... 524/838
5,223,586 A    6/1993  Mautner et al.
5,760,109 A *  6/1998  Inokuchi et al. ............ 523/414
5,854,369 A   12/1998  Geck et al.
6,245,852 B1 * 6/2001  Hasegawa et al. .......... 524/837

FOREIGN PATENT DOCUMENTS

EP          857748       8/1998
EP          852595       6/1999
EP          882105      11/1999
WO      WO 99/14269      3/1999

OTHER PUBLICATIONS

Merriam–Webster's Collegiate Dictionary, 10$^{th}$ Ed., Merriam–Webster, 1998, p. 1118.*

Derwent Abstract corr. to EP 882105 [1997–537332].

Derwent Abstract corr. to EP 852595 [AN 1997–204374].

Derwent Abstract corr. to EP 857748 [AN 1998–415986].

Derwent Abstract corr. to WO99/14269 [AN 1999–205906].

* cited by examiner

*Primary Examiner*—Kuo-Liang Peng
(74) *Attorney, Agent, or Firm*—Brooks Kushman P.C.

(57) ABSTRACT

The invention relates to a method for isolating polyorganosiloxanes from an aqueous dispersion, wherein the polyorganosiloxanes are separated from water in a dissolved form with the aid of an extraction agent.

15 Claims, No Drawings

METHOD FOR ISOLATING POLYORGANOSILOXANES

BACKGROUND OF THE INVENTION

1. Field of the Invention

The invention relates to a process for isolating polyorganosiloxanes from an aqueous dispersion.

2. Description of the Related Art

Polyorganosiloxanes such as the polyorganosiloxane particle known from U.S. Pat. No. 5,854,369, the core-shell particles known from U.S. Pat. No. 5,049,636, and MQ resins are frequently used as solids. A problem encountered here is that the products are produced in aqueous solution in the form of dispersions and subsequently have to be isolated. This can be achieved, for example, by spraying drying or freeze drying of the dispersions. A disadvantage of this method is that after drying, the emulsifier used for producing the dispersion remains in the product, or has to be removed therefrom, for example by washing of the dried product.

As an alternative, the above-described compounds can be isolated from the aqueous dispersions as an organosol, as described in U.S. Pat. No. 5,049,636. A disadvantage of this process is the complicated solvent exchange in which water is replaced by solvents, which consumes a great deal of energy. Furthermore, the emulsifier remains in the product in this process.

SUMMARY OF THE INVENTION

It is therefore an object of the present invention to provide a process which makes possible the inexpensive isolation of polyorganosiloxanes and which also has a low energy consumption. Furthermore, the polyorganosiloxanes are to be provided in a form having a low emulsifier content. These and other objects are met by a process wherein an extractant is employed, and the polyorganosiloxanes are isolated from solution in the extractant.

DETAILED DESCRIPTION OF THE INVENTION

The invention provides a process for isolating polyorganosiloxanes from an aqueous dispersion, which comprises separating the polyorganosiloxanes from the water in dissolved form by means of an extractant.

The water present in the preparation of the polyorganosiloxanes is separated off from the solution not by distillation but in an energy-saving way by simple phase separation. The polyorganosiloxanes are dissolved in the extractant.

The polyorganosiloxanes can be separated off from an aqueous and emulsifier-containing dispersion or from an emulsifier-free aqueous solution.

The aqueous dispersion is, in particular, a dispersion containing water as continuous phase.

The polyorganosiloxanes are preferably high molecular weight polyorganosiloxanes having a molar mass $M_w$ of at least 1000 g/mol, particularly preferably at least 10 000 g/mol, in particular at least 100 000 g/mol, where the molecular weights are preferably determined by means of gel permeation chromatography.

The process for isolating polyorganosiloxanes is particularly useful for crosslinked and/or particulate polyorganosiloxanes. Furthermore, the process is especially useful for the isolation of branched polyorganosiloxanes, e.g. dendrimers.

The polyorganosiloxanes, in particular the surface or external shell of particles, can also have been modified by monomeric organic or inorganic units selected from among, for example, (meth)acryloxyalkyl radicals such as the methacryloxypropyl radical and the methacryloxypropyl radical; epoxyalkyl radicals such as glycidyloxyalkyl radicals; mercaptoalkyl, aminoalkyl, ureidoalkyl and alkenyl radicals such as vinyl radicals; hydroxyalkyl radicals, (hydroxyaryl)alkyl radicals, sulfonato radicals, polymeric radicals such as polyethylene oxide, polypropylene oxide, poly(alkyl (meth)acrylate), polystyryl and polyolefin radicals, chemically bound metal compounds such as coordinated metal compounds or covalently bound metal compounds such as organoaluminum compounds; and metal atoms in the oxidation state 0, which in each case have an intermetallic interaction with a further metal atom in the oxidation state 0.

Preference is also given to surface-modified polyorganosiloxanes which consist of a polyorganosiloxane core polymer and an additional shell of organic polymer, for example a polymer derived from monoethylenically unsaturated or multiply ethylenically unsaturated monomers. Such modified polyorganosiloxanes are described, for example, in EP-A-882105 and U.S. Pat. No. 5,223,586, which are expressly incorporated by reference.

Further preferred polyorganosiloxanes are described, for example, in U.S. Pat. No. 5,049,636, U.S. Pat. No. 5,854,369, EP-A-852595, EP-A-857748 and WO 99/14269, which are expressly incorporated by reference.

Resin-like polyorganosiloxanes are preferably made up of units of the formula (1),

where
R are identical or different and are each a hydrogen atom or a monovalent SiC-bonded, substituted or unsubstituted $C_1$–$C_{18}$-hydrocarbon radical,
$R^1$ are identical or different and are each a hydrogen atom or a monovalent $C_1$–$C_6$-alkyl radical,
x is 0, 1, 2 or 3, preferably on average from 0.5 to 2.5, particularly preferably on average from 0.8 to 2.3, and
y is 0, 1, 2 or 3, preferably on average from 0 to 1.1, particularly preferably on average from 0.01 to 0.1,
with the proviso that x+y≦3.

The radical R is preferably an unsubstituted or substituted straight-chain or branched $C_1$–$C_{12}$-alkyl radical, hydrogen or the phenyl radical, in particular a methyl, ethyl, propyl, octyl, hexyl, dodecyl, octadecyl, phenyl, vinyl, allyl, methacryloxypropyl, 3-chloropropyl, 3-mercaptopropyl, 3-hydroxypropyl, 3-(2,3-dihydroxypropoxy)propyl, 3-(2-hydroxyphenyl)propyl, 3-(4-methoxy-3-hydroxyphenyl)propyl, 2-cyanoethyl, 3-aminopropyl or (2-aminoethyl)-3-aminopropyl radical, hydrogen or a quaternary ammonium radical.

Examples of radicals $R^1$ are hydrogen and the examples of $C_1$–$C_6$-alkyl radicals given for the radical R. The radical $R^1$ is preferably a hydrogen atom or an alkyl group having from 1 to 4 carbon atoms, with the methyl and ethyl radicals being particularly preferred.

Particularly preferred high molecular weight polyorganosiloxanes are polyorganosiloxane particles which consist of a single molecule, are crosslinked, have a mean diameter of from 5 to 200 nm, are soluble to an extent of at least 5% by weight in a solvent selected from among pentane, toluene, acetone, tetrahydrofuran, ethanol and water at 20° C. and in which at least 50%, in particular at least 80%, of the particles have a diameter which deviates from the mean diameter by not more than 50%, in particular not more than 30%.

The polyorganosiloxane particles typically have mean molar masses $M_w$ of at least $10^5$, in particular from $5\times10^5$ to not more than $10^{10}$, in particular $10^9$. The mean diameters of the polyorganosiloxane particles are preferably at least 10 and not more than 150 nm. Preference is given to at least 80% of the particles having a diameter which deviates from the mean diameter by not more than 20%, in particular not more than 10%.

The polyorganosiloxane particles are preferably spherical microgels.

The polyorganosiloxane particles are intramolecularly crosslinked but have no intermolecular crosslinking between the polyorganosiloxane particles. The polyorganosiloxane particles are therefore readily soluble in solvents. The solvent in which the polyorganosiloxane particles dissolve to an extent of at least 5% by weight depends on the structure of the polyorganosiloxane particles and particularly on the groups located on the surface of the polyorganosiloxane particles. There is a suitable solvent for every type of polyorganosiloxane particles.

The solubility of the polyorganosiloxane particles is determined, for example, at 20° C. A particularly useful solvent for polyorganosiloxane particles bearing hydrocarbon radicals is toluene, a particularly useful solvent for polyorganosiloxane particles bearing amino radicals is tetrahydrofuran and a particularly useful solvent for polyorganosiloxane particles bearing sulfonato radicals is water. For example, polyorganosiloxane particles bearing hydrocarbon radicals have virtually unlimited solubility in toluene and are soluble to an extent of up to 15% by weight in liquid polydimethylsiloxane having a viscosity of 35 mPa.s at 25° C. The polyorganosiloxane particles are preferably soluble to an extent of at least 1% by weight, in particular at least 5% by weight, in a solvent selected from among hexane, toluene, tetrahydrofuran, acetone and water.

The polyorganosiloxane particles preferably comprise at least 95% by weight, in particular at least 98% by weight, of the following units:

from 0.5 to 80.0% by weight of units of the formula (2)

$$[R^2{}_3SiO_{1/2}] \quad (2),$$

from 0 to 99.0% by weight of units of the formula (3)

$$[R^2{}_2SiO_{2/2}] \quad (3),$$

from 0 to 99.5% by weight of units of the formula (4)

$$[R^2SiO_{3/2}] \quad (4),$$

from 0 to 80.0% by weight of units of the formula (5)

$$[SiO_{4/2}] \quad (5) \text{ and}$$

from 0 to 20.0% by weight of units of the formula (61)

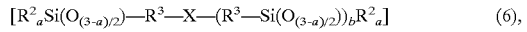

$$[R^2{}_aSi(O_{(3-a)/2})-R^3-X-(R^3-Si(O_{(3-a)/2}))_bR^2{}_a] \quad (6),$$

where
$R^2$ is as defined for R,
$R^3$ are identical or different and are each a divalent SiC-bonded, substituted or unsubstituted $C_1$–$C_{18}$-hydrocarbon radical which may be interrupted by divalent radicals which are bound on each side to carbon atoms and are selected from the group consisting of —O—, —COO—, —OOC—, —CONR$^4$—, —NR$^4$CO— and —CO—,
$R^4$ is a hydrogen atom or a radical $R^2$,
X is a radical selected from the group consisting of —N=N—, —O—O—, —S—S— and —C(C$_6$H$_5$)$_2$—C(C$_6$H$_5$)$_2$—, a is 0, 1 or 2, and
b is 0 or 1,
with the proviso that the sum of the units of the formulae (4) and (5) is at least 0.5% by weight.

Examples and preferred examples of the radical $R^2$ are those given for the radical R.

Examples of divalent hydrocarbon radicals $R^3$ are saturated alkylene radicals such as the methylene and ethylene radicals and also propylene, butylene, pentylene, hexylene, cyclohexylene and octadecylene radicals or unsaturated alkylene or arylene radicals such as the hexenylene radical and phenylene radicals and in particular radicals of the formula (7)

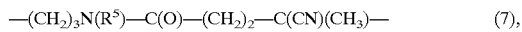

$$-(CH_2)_3N(R^5)-C(O)-(CH_2)_2-C(CN)(CH_3)- \quad (7),$$

where
$R^5$ is a hydrogen atom or a methyl or cyclohexyl radical, and
(8)

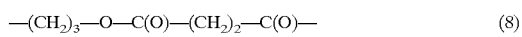

$$-(CH_2)_3-O-C(O)-(CH_2)_2-C(O)- \quad (8)$$

Preferred radicals X are —N=N— and —O—O—.

Particularly preferred units of the formula (6) have the formula (9)

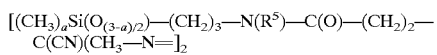

$$[(CH_3)_aSi(O_{(3-a)/2})-(CH_2)_3-N(R^5)-C(O)-(CH_2)_2-C(CN)(CH_3-N=]_2$$

where a and $R^5$ are as defined above.

The aqueous dispersions of polyorganosiloxanes are preferably prepared by hydrolysis and condensation or organosilanes and/or low molecular weight polyorganosiloxanes in the presence of water. However, other aqueous dispersions of polyorganosiloxanes known from and described in the literature can in principle also be used for the process of the invention in order to isolate polyorganosiloxanes.

The polyorganosiloxanes are preferably prepared at temperatures of from 20 to 150° C. under a pressure of from 500 to 6000 hPa (abs.).

The preparation of the aqueous and emulsifier-containing dispersions is described, for example, in U.S. Pat. No. 5,049,636, U.S. Pat. No. 5,854,369, EP-A-852595, EP-A-857748 and WO 99/14269.

The polyorganosiloxane particles are preferably prepared in a process comprising at least 2 steps, in which a colloidal aqueous and emulsifier-containing dispersion is obtained. Particular preference is given to the method of preparation described in U.S. Pat. No. 5,854,369, column 4, line 7 to column 7, line 14.

Emulsifiers which are particularly useful for the dispersions are alkyl sulfates, e.g. having a chain length of 8–18 carbon atoms, aryl and alkyl ether sulfates having 8–18 carbon atoms in the hydrophobic radical and 1–40 ethylene oxide (EO) or propylene oxide (PO) units;

sulfonates, e.g. alkylsulfonates having 8–18 carbon atoms, alkylarylsulfonates having 8–18 carbon atoms, esters and monoesters of sulfosuccinic acid with monohydric alcohols or alkylphenols having 4–15 carbon atoms; these alcohols or alkylphenols may also be ethoxylated with 1–40 EO units;

alkali metal and ammonium salts of carboxylic acids having 8–20 carbon atoms in the alkyl, aryl, alkaryl or aralkyl radical;

partial esters of phosphoric acid and their alkali metal and ammonium salts, e.g. alkyl and alkaryl phosphates having 8–20 carbon atoms in the organic radical, alkyl ether phosphates or alkaryl ether phosphates having 8–20 carbon atoms in the alkyl or alkaryl radical and 1–40 EO units;

alkyl polyglycol ethers having 2–40 EO units and alkyl radicals of 4–20 carbon atoms;

alkyl aryl polyglycol ethers having 2–40 EO units and 8–20 carbon atoms in the alkyl and aryl radicals;

ethylene oxide-propylene oxide (EO-PO) block copolymers having 8–40 EO and PO units;

fatty acid polyglycol esters having 6–24 carbon atoms and 2–40 EO units;

alkyl polyglycosides, natural products and their derivatives, e.g. lecithin, lanolin, saponins, cellulose; cellulose alkyl ethers and carboxyalkyl-celluloses whose alkyl groups each have up to 4 carbon atoms;

linear organo(poly)siloxanes containing polar groups and having alkoxy groups having up to 24 carbon atoms and/or up to 40 EO and/or PO groups;

salts of primary, secondary and tertiary fatty amines having 8–24 carbon atoms with acetic acid, sulfuric acid, hydrochloric acid and phosphoric acids;

quaternary ammonium salts such as halides, sulfates, phosphates, acetates or hydroxides, whose alkyl groups have, independently of one another, 1–24 carbon atoms; the alkyl or alkaryl or aralkyl groups of the quaternary ammonium compounds may also be partially ethoxylated (1–40 EO units);

alkylpyridinium, alkylimidazolinium and alkyloxazolinium salts whose alkyl chain has up to 18 carbon atoms, in the form of their halides, sulfates, phosphates or acetates.

Preference is given to aliphatically substituted benzenesulfonic acids and their salts and also unethoxylated or partially ethoxylated quaternary ammonium halides and hydroxides. Particular preference is given to dodecylbenzenesulfonic acid and benzyl-dimethyl{2-[2-(p-1,1,3,3-tetramethylbutylphenoxy)-ethoxy]ethyl}ammonium chloride (benzethonium chloride).

However, any mixtures of the emulsifiers mentioned can also be used for the aqueous dispersions.

Any mixtures of aqueous dispersions of polyorganosiloxanes are also suitable for the process of the invention.

The amount of emulsifier is 0.5–50% by weight, in particular 1.0–30% by weight, in each case based on the amount of polyorganosiloxane particles.

As extractant, it is in principle possible to use all organic or inorganic solvents which are able to dissolve polyorganosiloxanes, and also supercritical carbon dioxide. The boiling point at 1013 hPa (abs.) is preferably not more than 200° C.

Preference is given to, for example, aliphatic or aromatic hydrocarbons such as hexane, styrene, benzene, toluene, xylene, aliphatic or aromatic lactones, lactams, ketones, ketals, acetals, alcohols, thiols, amines, amides, esters, sulfones, and also low molecular weight polyorganosiloxanes such as hexamethyldisiloxane, octamethyltrisiloxane or cyclooctamethyltetrasiloxane, etc. Also preferred are polymerizable organic compounds such as substituted or functionalized (meth)acrylates and vinyl esters, e.g. hydroxyethyl methacrylate, hydroxymethyl methacrylate, methyl methacrylate, butyl acrylate, 1,6-hexanediol diacrylate, triethylene glycol dimethacrylate, urethane dimethacrylate, glycidyl methacrylate, etc., styrene, epoxy resins, such as bisphenol A diglycidyl ether and 3,4-epoxycyclohexylmethyl 3,4-epoxycyclohexanecarboxylate. Particular preference is given to toluene, butyl acetate and methyl isobutyl ketone.

Further suitable extractants are melts of organic or inorganic solids which become low-viscosity liquids above their melting point.

Furthermore, organic or inorganic polymeric compounds above their softening temperature or melting point are also suitable as extractants.

It is possible to use pure compounds or their mixtures as extractant.

Preference is given to using a precipitant in addition to the extractant.

It may be possible to dispense with the addition of a precipitant if the extractant has a particularly high affinity for the polyorganosiloxane or the solvent used as extractant has appropriate precipitation properties, i.e. precipitant and extractant are identical in this case. Examples of such extractants are alcohols such as methanol and ketones such as acetone.

As precipitant, it is in principle possible to use all salts or the abovementioned solvents as long as they are also suitable as precipitants. The precipitants are preferably selected from among chlorides, sulfates and carbonates of alkali metals, alkaline earth metals, aluminum and ammonium. It is possible to use pure salts or their solutions as precipitant. Furthermore, the precipitation can be carried out using all methods or substances which are capable of destabilizing dispersions, e.g. electric fields, polyions, temperature changes, shear, pressure, biological, thermal or chemical degradation of the surfactant. Combinations of the above-described methods or mixtures of the precipitants are also suitable for achieving destabilization. Further preferred precipitants are solvents which are miscible with water to an extent of at least 5% by weight at 20° C., e.g. acetone, methanol, ethanol, isopropanol, tetrahydrofuran, dioxane and dimethylformamide.

Based on 100 parts by weight of dispersion, preference is given to using from 10 to 500 parts by weight, in particular from 50 to 200 parts by weight, of extractant and of any precipitant. However, different amounts can also be used.

The extraction and, if appropriate, precipitation of the polyorganosiloxanes is preferably carried out at temperatures of from 0 to 190° C., in particular at temperatures of from 10 to 100° C., preferably at the pressure of the surrounding atmosphere, i.e. at about 1013 hPa (abs.). However, higher, preferably up to 10 000 hPa, or lower pressures can also be employed if desired.

The extraction and if appropriate precipitation of the polyorganosiloxanes is preferably carried out batchwise or by a continuous process.

In a preferred embodiment of batchwise extraction and precipitation of the polyorganosiloxanes, the precipitant which is suitable for precipitating the dispersion of the polyorganosiloxanes is placed in a reaction vessel and a dispersion of the polyorganosiloxanes to be extracted is then introduced with vigorous stirring. A solvent suitable for the extraction is then added while stirring and the mixture is preferably stirred for some time to extract the polyorganosiloxanes. The phases are subsequently separated. The polyorganosiloxane-containing phase can if necessary be freed of any residues of the emulsifier used for preparing the dispersion, if some or all of this goes over into the extractant together with the polyorganosiloxane, by washing. However, any other order of addition can be chosen in principle.

In a preferred embodiment of continuous extraction and precipitation of the polyorganosiloxanes, the precipitant which is suitable for precipitating the dispersion of the polyorganosiloxanes and a dispersion of the polyorganosiloxanes to be extracted and also a solvent suitable for the extraction are brought into contact with one another. The phases are subsequently separated and the polyorganosiloxane-containing phase is freed of the emulsifier used for preparing the dispersion by continuous or discontinuous washing or adsorptive process steps using, for example, activated carbon, aluminum oxide or finely divided silica. However, any other order of addition of the materials used can also be chosen in principle.

If the emulsifier content is to be reduced further, the solution of the polyorganosiloxanes is preferably washed with suitable washing solutions which are able to remove the emulsifier from the extract.

Examples of suitable washing solutions are water and dilute or saturated aqueous salt solutions.

The polyorganosiloxanes can be freed of the solvent by known continuous or batchwise methods, e.g. spray drying or distillation or by any other suitable physical method.

The invention is illustrated by the examples below. All parts and percentages are by weight. The examples are carried out at the pressure of the surrounding atmosphere, i.e. at about 0.1 MPa.

EXAMPLES

The apparatus for the batchwise preparation of the polyorganosiloxanes comprises a 1 liter round-bottomed flask which is provided with a stirrer and a dropping funnel. The flask is, if necessary, heated by means of a heating mantle.

After precipitation and extraction, the product-containing phase is, if desired, freed of the surfactant used for preparation of the dispersion by washing and the extract is, if appropriate, freed of solvent under reduced pressure on a rotary evaporator. The progress of the extraction is followed by determining the solids content of the extract. The extract can, if desired, be directly processed further, e.g. cured after possible addition of further components if a curable compound has been chosen as extractant.

Dispersion A 12.0 g of cetyltrimethylammonium bromide and 0.9 g of 1 N NaOH solution are added to 500.0 g of deionized water, and 77.1 g of methyltrimethoxysilane are added dropwise at 50° C. over a period of 2 hours. After stirring for another 30 minutes, 2.3 g of 3(cyclohexylamino) propyltrimethoxysilane are added dropwise at room temperature over a period of 5 minutes and the mixture is stirred at this temperature for a further 30 minutes. Over a period of 30 minutes, a total of 29.4 g of trimethylmethoxysilane are added.

Dispersion B

A mixture of 480.0 g of deionized water and 2.0 g of dodecylbenzenesulfonic acid is brought to a pH of 12 by means of 13.3 g of 1 N NaOH solution and the mixture is heated to 90° C. At this temperature, a mixture of 66.1 g of phenyltriethoxysilane and 16.0 g of methyltrimethoxysilane is added over a period of 5 hours and the mixture is subsequently stirred for another 15 minutes. The mixture is allowed to cool to RT and the pH is adjusted to 1.5 by means of 23.9 g of 0.5 N hydrochloric acid. 31.3 g of trimethylmethoxysilane are then added over a period of 30 minutes.

Dispersion C

A mixture of 500.0 g of deionized water, 12.0 g of benzethonium chloride and 0.9 g of 1 N NaOH solution is placed in a reaction vessel at room temperature. A mixture of 40.0 g of dimethyldimethoxysilane and 60.0 g of methyltrimethoxysilane is added over a period of 5 hours. After the mixture has been stirred for another 5 hours at room temperature, 29.4 g of trimethylmethoxysilane are added over a period of 30 minutes.

Dispersion D

A mixture of 480.0 g of deionized water and 2.0 g of dodecylbenzenesulfonic acid is placed in a reaction vessel and heated to 50° C. 80.0 g of methyltrimethoxysilane are added over a period of 2.5 hours and the mixture is stirred for another 1 hour. 27.8 g of trimethylmethoxysilane are subsequently added at 30° C. and the mixture is neutralized by means of 1 N NaOH solution.

Dispersion E 482.3 g of deionized water are admixed with 17.7 g of 10% strength sodium dodecyl sulfate solution and the mixture is acidified with 0.75 g of concentrated sulfuric acid. 100.0 g of methyltrimethoxysilane are then added dropwise at 50° C. over a period of 2 hours. The mixture is cooled to room temperature and 31.6 g of trimethylmethoxysilane are added.

Examples 1 to 8

To carry out the extraction, equal amounts of dispersion, precipitant and extractant (ratio=1:1:1) are stirred well for 5 minutes and the phases are then allowed to separate. After one hour, the solids content of the organic phase is determined.

The table shows the starting dispersions, precipitants and organic solvents as extractants used in the examples and the resulting solids content of the extract.

TABLE

| Example | Dispersion | Precipitant | Extractant | Solids content of the extract |
|---------|------------|-------------|------------|-------------------------------|
| 1 | A | 5% of $MgSO_4$ | Ethyl acetate | 7.4% |
| 2 | B | 25% of NaCl | Ethyl acetate | 6.1% |
| 3 | B | 25% of NaCl | THF | 6.9% |
| 4 | C | 5% of $MgSO_4$ | Toluene | 7.4% |
| 5 | C | 10% of HCl | Toluene | 8.7% |
| 6 | D | 10% of HCl | Toluene | 5.9% |
| 7 | E | 25% of NaCl | MIBK | 6.2% |
| 8 | E | 5% of $HgSO_4$ | Hexamethyldisiloxane | 5.9% |

What is claimed is:

1. A process for isolating one or more solid, particulate, intramolecularly crosslinked polyorganosiloxanes from an aqueous dispersion thereof, which comprises separating the polyorganosiloxane(s) from water of said aqueous dispersion in dissolved form by means of an extractant wherein at least one of said polyorganosiloxanes comprises a particulate core/shell polyorganosiloxane.

2. A process for isolating one or more solid, particulate, intramolecularly crosslinked polyorganosiloxanes from an aqueous dispersion thereof, which comprises separating the polyorganosiloxane(s) from water of said aqueous dispersion in dissolved form by means of an extractant wherein said aqueous dispersion contains at least one emulsifier, and a solution of polyorganosiloxane in extractant is separated from said aqueous dispersion and treated to remove emulsifier from said solution.

3. The process of claim 2, wherein said extractant comprises an organic extractant and said emulsifier is remove from said solution by washing with water.

4. The process of claim 3, wherein said water further contains at least one dissolved salt.

5. The process of claim 2, wherein said extractant comprises an organic extractant, and said emulsifier is remove from said solution by contacting said solution with at least one of activated carbon, aluminum oxide, or finely divided silica.

6. A process for isolating one or more solid, particulate, intramolecularly crosslinked polyorganosiloxanes from an aqueous dispersion thereof, which comprises separating the polyorganosiloxane(s) from water of said aqueous dispersion in dissolved form by means of an extractant wherein at least one extractant is an organic extractant selected from the group consisting of aliphatic hydrocarbons, aromatic hydrocarbons, lactones, lactams, ketones, ketals, acetals, thiols, amines, amides, esters, sulfones, liquid polyorganosiloxanes, (meth)acrylates, and epoxy compounds, said process further comprising adding to said aqueous dispersion an organic precipitant which is miscible with water to an extent of at least 5% by weight at 20° C., said percent by weight based on the weight of the organic precipitant and water, said organic precipitant being different from said extractant.

7. The process of claim 6, wherein at least one organic extractant is selected from the group consisting of toluene, butyl acetate, and methyl isobutyl ketone.

8. The process of claim 6, wherein said organic extractant is a curable organic extractant.

9. A process for isolating one or more solid, particulate, polyorganosiloxanes from an aqueous dispersion thereof, which comprises separating the polyorganosiloxane(s) from water of said aqueous dispersion in dissolved form by means of an extractant, wherein at least one said extractant comprises toluene, butyl acetate, methyl isobutyl ketone, aliphatic hydrocarbons, aromatic hydrocarbons other than toluene, supercritical carbon dioxide, or liquid organosiloxanes.

10. A continuous process or the separation of polyorganosiloxanes from an aqueous composition in which they have been prepared, said aqueous composition containing at least one surfactant, said process comprising continuously contacting said aqueous composition with an organic extractant;

continuously removing a solution of polyorganosiloxane in said organic extractant;

decreasing a surfactant concentration of said solution.

11. The process of claim 10, wherein said step of decreasing said surfactant concentration comprises one or more surfactant removal steps selected from the group consisting of washing said solution with at least one solvent in which said surfactant is soluble, and adsorbing said surfactant on a solid adsorbant.

12. The process of claim 10, further comprising adding a precipitant to the aqueous composition.

13. The process of claim 10, further comprising adding a precipitant salt to the aqueous composition.

14. A process for isolating one or more solid, particulate, intramolecularly crosslinked polyorganosiloxanes from an aqueous dispersion thereof, which comprises separating the polyorganosiloxanes(s) from water of said aqueous dispersion in dissolved form by means of an extractant further comprising adding a precipitant salt to said aqueous dispersion.

15. The process of claim 14, wherein at least one precipitant is selected from the group consisting of chlorides, sulfates and carbonates of alkali metals, alkaline earth metals, aluminum and ammonium.

* * * * *